(12) United States Patent
Ikeda et al.

(10) Patent No.: US 7,911,172 B2
(45) Date of Patent: Mar. 22, 2011

(54) MACHINE POSITION CONTROL DEVICE

(75) Inventors: Hidetoshi Ikeda, Chiyoda-ku (JP);
Yoshihiro Marushita, Chiyoda-ku (JP);
Kei Terada, Chiyoda-ku (JP); Takashi Isoda, Chiyoda-ku (JP); Hiroto Takei, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 495 days.

(21) Appl. No.: 11/917,423

(22) PCT Filed: Mar. 31, 2006

(86) PCT No.: PCT/JP2006/306829
§ 371 (c)(1),
(2), (4) Date: Jun. 13, 2008

(87) PCT Pub. No.: WO2006/134702
PCT Pub. Date: Dec. 21, 2006

(65) Prior Publication Data
US 2009/0284208 A1 Nov. 19, 2009

(30) Foreign Application Priority Data
Jun. 17, 2005 (JP) .................................. 2005-177845

(51) Int. Cl.
*G05B 6/02* (2006.01)
(52) U.S. Cl. ........ 318/621; 318/623; 318/622; 318/611; 318/560

(58) Field of Classification Search .................. 318/621, 318/611, 560, 622, 623
See application file for complete search history.

(56) References Cited

U.S. PATENT DOCUMENTS

| 6,515,442 B1 * | 2/2003 | Okubo et al. ................. 318/560 |
| 6,590,358 B1 * | 7/2003 | Tsutsui ......................... 318/560 |
| 7,224,141 B2 * | 5/2007 | Ide ................................ 318/807 |

FOREIGN PATENT DOCUMENTS

| JP | 58-14376 A | 1/1983 |
| JP | 11-184529 A | 7/1999 |
| JP | 2004-171333 A | 6/2004 |
| JP | 2004-334772 A | 11/2004 |
| JP | 2005-275588 A | 10/2005 |

* cited by examiner

*Primary Examiner* — Walter Benson
*Assistant Examiner* — David S Luo
(74) *Attorney, Agent, or Firm* — Sughrue Mion, PLLC

(57) ABSTRACT

An accurate load position control is made possible even when rigidity of a load drive system using a motor is relatively low. Load position signal $x_l$ is a present-position measurement value of a load, and after compensation in response to a phase delay thereof has been performed by a stability compensation circuit, the high-frequency portion thereof is taken as a control-target position signal $x_{fb}$ by replacing, in a position-signal combination circuit, a motor position signal xm as a present-position measurement value of a motor, and then the control-target position signal $x_{fb}$ is fed back to a position control circuit. Thereby, a torque command signal indicating a torque target value for driving the load is outputted.

6 Claims, 6 Drawing Sheets

US 7,911,172 B2

MACHINE POSITION CONTROL DEVICE

TECHNICAL FIELD

The present invention relates to machine position control devices such as machine tools and component mounting machines, for controlling positions of machine systems, which are driven using an actuator such as a motor.

BACKGROUND ART

A conventional machine position control device has been configured to enhance stability of its control system using, as a feedback signal for the position controller, a signal obtained by summing up signals obtained by low-pass filtering a load-position signal as a load-position detection value, and by high-pass filtering a motor-position signal as a motor-position detection value: a motor-position signal with no phase delay in a frequency band over its resonance frequency where the phase delay of the load-position signal becomes significant, because a driving system using a motor has a limited rigidity (for example, refer to Patent Document 1).

Moreover, in another conventional machine position control device, a pre-compensator is provided therein which configuration enables high-accurate control with a deformation error along moving directions of a machine system being compensated, by adding to an input parameter, a signal, as a feed-forward compensation value, obtained by multiplying by a gain the second order differential value of the input parameter (for example, refer to Patent Document 2).

[Patent Document 1] Japanese Laid-Open Patent Publication No. 2004-334772 (FIG. 1)

[Patent Document 2] Japanese Laid-Open Patent Publication No. 1999-184529 (FIG. 3 and FIG. 4)

DISCLOSURE OF THE INVENTION

Problems to be Solved by the Invention

In the configuration in which the signal obtained by summing the signal having been obtained by low-pass filtering the load position signal and the signal having been obtained by high-pass filtering the motor position signal is used as the feedback signal into the position controller, in order to improve the control accuracy of the load position, the filter frequencies of the high-pass filter and the low-pass filter are necessary to be substantially increased. However, in a case in which the rigidity of the load driving-system with the motor is relatively low, if the filter frequency is increased, the control system becomes unstable; therefore, because the filter frequency could not be sufficiently increased, a problem has occurred that the load position is difficult to be accurately controlled.

Moreover, in the configuration in which the pre-compensator is provided, because the feed-forward compensation value is calculated based on the second order differential value of the input parameter based on the position command signal, and is summed, varying of a torque command signal corresponding to that of the position command signal becomes steep, and impact applied to a control target increases; therefore, the gain of the position controller cannot be sufficiently increased. As a result, accurate position control of the load is difficult to be realized; moreover, a problem has occurred that vibration generated when an external disturbance is exerted to the control target cannot be suppressed.

Means for Solving the Problem

A machine position control device according to the present invention includes a position-speed control circuit in which a torque command signal representing a torque target value at which a motor drives a load is calculated by summing a position command signal representing a load-position target value, and feedback signals of a motor position signal representing a present position of the motor, a motor speed signal representing a present speed of the motor, and a control-target position signal as reference information related to the present positions of the motor and the load. The control-target position signal is configured in such a way that a signal including a low-frequency component of a compensated load-position signal obtained by compensating the phase delay thereof in a stability compensation circuit, and a signal including a high-frequency component of a motor position signal are combined in a position-signal combination circuit, based on a transfer function for advancing the phase of a load position signal that is the measurement value of the load present-position.

Advantageous Effect of the Invention

According to the present invention, even when the rigidity of the load drive system using the motor is relatively low, by performing the load position control in which the load position signal is fed back, as stable as the semi-closed control in which only the motor position signal is fed back, an accurate load position control can be realized.

EXPLANATION OF SYMBOLS

10 Control target
20 Load
30 Motor
80, 80a Stability compensation circuit as stability compensation means
110 Position-speed control circuit as position-speed control means
140 Damping compensation circuit as damping compensation means

BEST MODE FOR CARRYING OUT THE INVENTION

Embodiment 1

Figure 1:
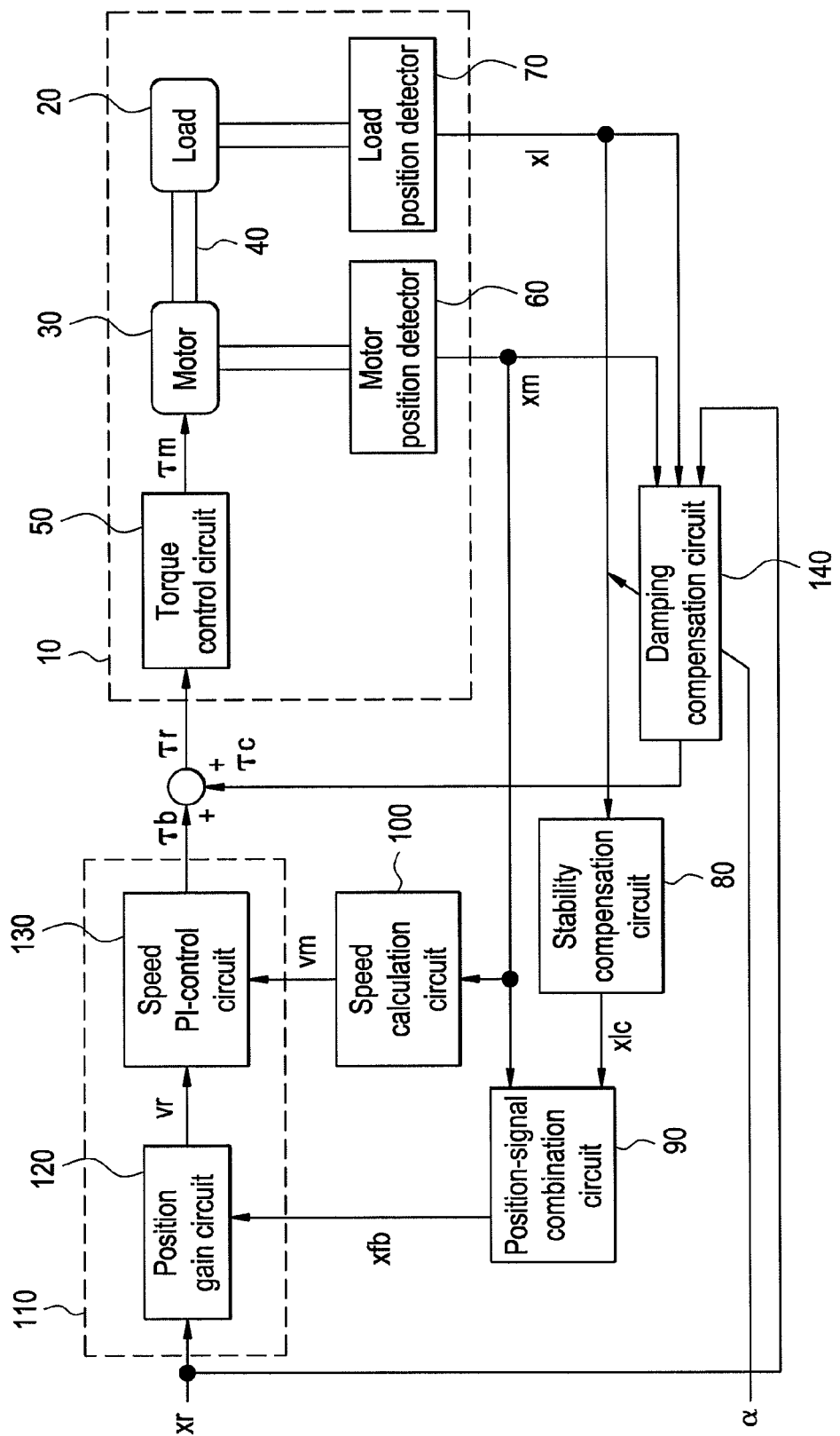
FIG. 1 is a block diagram illustrating a machine position control device according to Embodiment 1 of the present invention.

FIG. 1 is a block diagram illustrating a machine position control device according to Embodiment 1 of the present invention.

A control target 10 includes a motor 30 for driving a load 20, in which the motor 30 drives the load 20 through a torque transmission mechanism 40 such as a timing belt and a ball screw, and the torque $\tau_m$ of the motor 30 is controlled so as to be agree with a torque command signal $\tau_r$ by a torque control circuit 50.

Moreover, the present position of the motor 30 is detected by a motor position detector 60 such as an encoder attached to the motor 30, and is outputted as a motor position signal $x_m$, while the present position of the load 20 is detected by a load position detector 70 such as a linear scale attached to the load 20, and is outputted as a load position signal $x_l$.

A stability compensation circuit 80 receives the load position signal $x_l$ as input, and outputs a compensated load-position signal $x_{lc}$ in which the phase delay of the load position signal $x_l$ is compensated; and a position-signal combination circuit 90 receives as input the compensated load-position signal $x_{lc}$ and the motor position signal $x_m$, and outputs a control-target position signal $x_{fb}$ that is a feedback signal related to the position of the motor and the load.

A speed calculation circuit 100 receives the motor position signal $x_m$ as input, and outputs a motor speed signal $v_m$ that represents the present value of the motor speed.

A position-speed control circuit 110 is configured of a position gain circuit 120 that receives as input a position command signal $x_r$ and the control-target position signal $x_{fb}$, and outputs a speed command $v_r$ as a speed target value, and of a speed PI-control circuit 130 that receives as input the speed command $v_r$ and the motor speed signal $v_m$, and outputs a basic control-torque signal $\tau_b$ to be a basis for calculating the torque command signal $\tau_r$.

A damping compensation circuit 140 receives as input the position command signal $x_r$, the motor position signal $x_m$, and the load position signal $x_l$, and outputs, based on a damping adjustment parameter $\alpha$ set from the outside, a damping-compensation torque signal $\tau_c$ that compensates the basic control-torque signal $\tau_b$. A signal obtained by adding the damping-compensation torque signal $\tau_c$ to the basic control-torque signal $\tau_b$ agrees with the torque command signal $\tau_r$.

Next, an operation is explained.

The position gain circuit 120 outputs as the speed command $v_r$ a signal obtained by multiplying by a position gain $k_p$ a deviation between the position command signal $x_r$ and the control-target position signal $x_{fb}$. That is, calculation of the following equation is performed.

[Equation 1]

$$v_r = k_p(x_r - x_{fb}) \tag{1}$$

Next, as expressed by the following equation, the speed calculation circuit 100 outputs the motor speed signal $v_m$ by differentiating the motor position signal $x_m$.

[Equation 2]

$$v_m = s \cdot x_m \tag{2}$$

Next, the speed PI-control circuit 130 receives as input the speed command $v_r$ and the motor speed signal $v_m$, and outputs, using a speed gain $k_v$ and a speed-integration gain $\omega_{vi}$, the basic control-torque signal $\tau_b$ according to PI (proportional integral) calculation expressed by the following equation.

[Equation 3]

$$\tau_b = \frac{k_v(s + \omega_{vi})}{s}(v_r - v_m) \tag{3}$$

Next, characteristics of the control target 10 are explained.

When mechanical rigidity of the control target 10 is relatively low, the control target 10 has the characteristics of a mechanical resonance whose frequency is relatively low (from several Hz to several-ten Hz). Focusing on the lowest-frequency mechanical-resonance characteristic, the characteristic of the control target 10 can be approximated by a two-inertia system in which the motor 30 and the load 20 are connected with the torque transmission mechanism 40 as a spring. Therefore, if the responsiveness of the torque control circuit 50 is sufficiently fast, a transfer function $G_p(s)$ from the torque command signal $\tau_r$ to the motor position signal $x_m$, and a transfer function $G_l(s)$ from that to the load position signal $x_l$ are respectively expressed as follows:

[Equation 4]

$$\frac{x_m}{\tau_r} = G_p(s) = \frac{\omega_z^{-2}s^2 + 1}{J \cdot s^2(\omega_p^{-2}s^2 + 1)} \tag{4}$$

[Equation 5]

$$\frac{x_l}{\tau_r} = G_l(s) = \frac{1}{J \cdot s^2(\omega_p^{-2}s^2 + 1)} \tag{5}$$

where J denotes all inertia effects of the control target 10, $\omega_z$ denotes the anti-resonance frequency, and $\omega_p$ denotes the resonance frequency.

Here, the transfer function $G_p(s)$ from the torque command signal $\tau_r$ to the motor position signal $x_m$ has complex zeroes (anti-resonance points) $z_0$ corresponding to the anti-resonance frequency $\omega_z$.

[Equation 6]

$$z_0 = \pm j \cdot \omega_z \tag{6}$$

Figure 2:
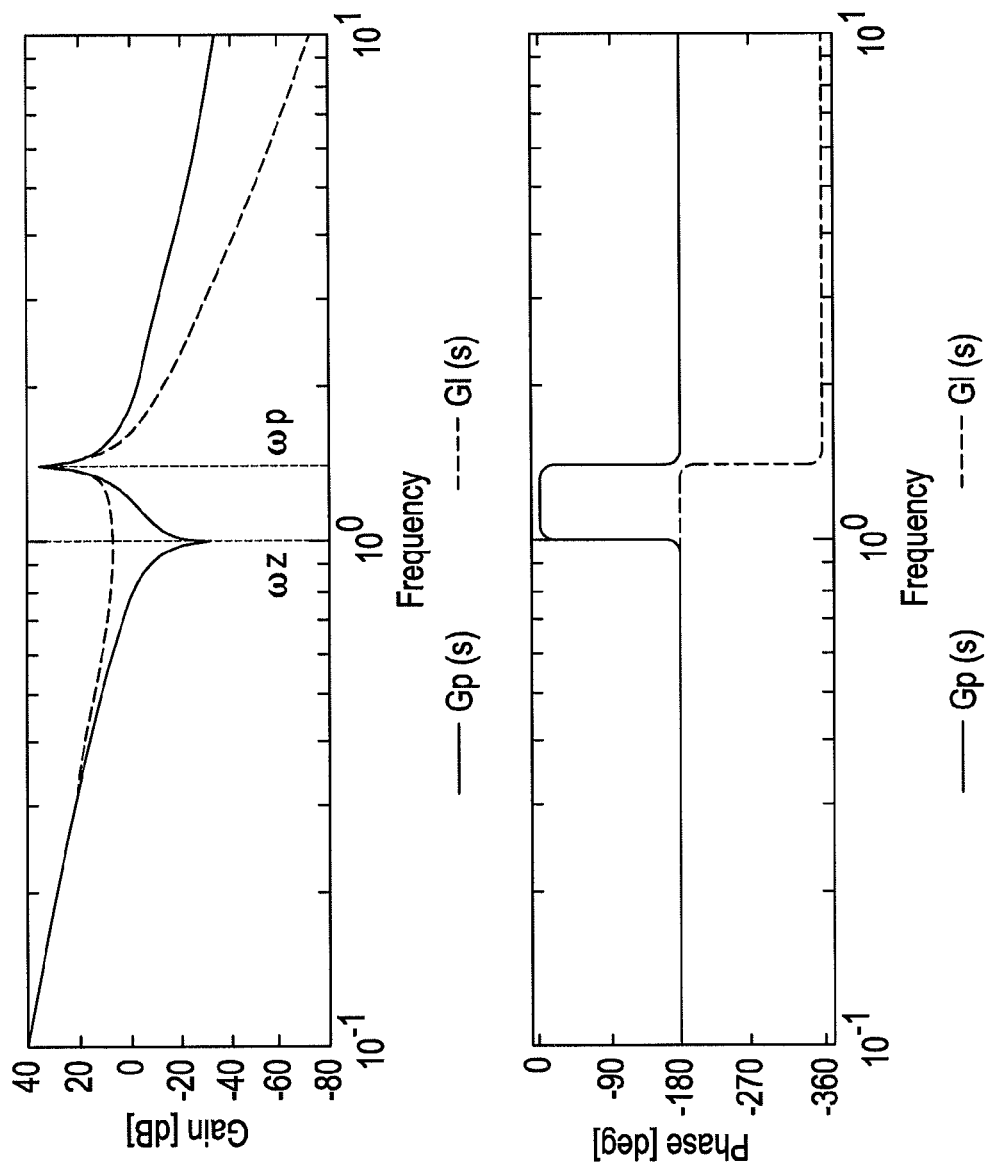
FIG. 2 is views representing a frequency response of a control target.

Frequency response of the transfer functions of the control target 10, expressed by Equation 4 and Equation 5, is represented in FIG. 2. FIG. 2 represents that, regarding the transfer function $G_p(s)$ from the torque command signal $\tau_r$ to the motor position signal $x_m$, the phase is never delayed exceeding −180 degrees, but, regarding the transfer function $G_l(s)$ to the load position signal $x_l$, the phase is significantly delayed at the resonance frequency $\omega_p$.

Next, in order to explain operations of the stability compensation circuit 80 and the position-signal combination circuit 90, a semi-closed control system in which the feedback with respect to the position of the load 20 is not utilized is explained, which is a control system most widely used in a case in which a machine system is driven using a motor.

Figure 3:
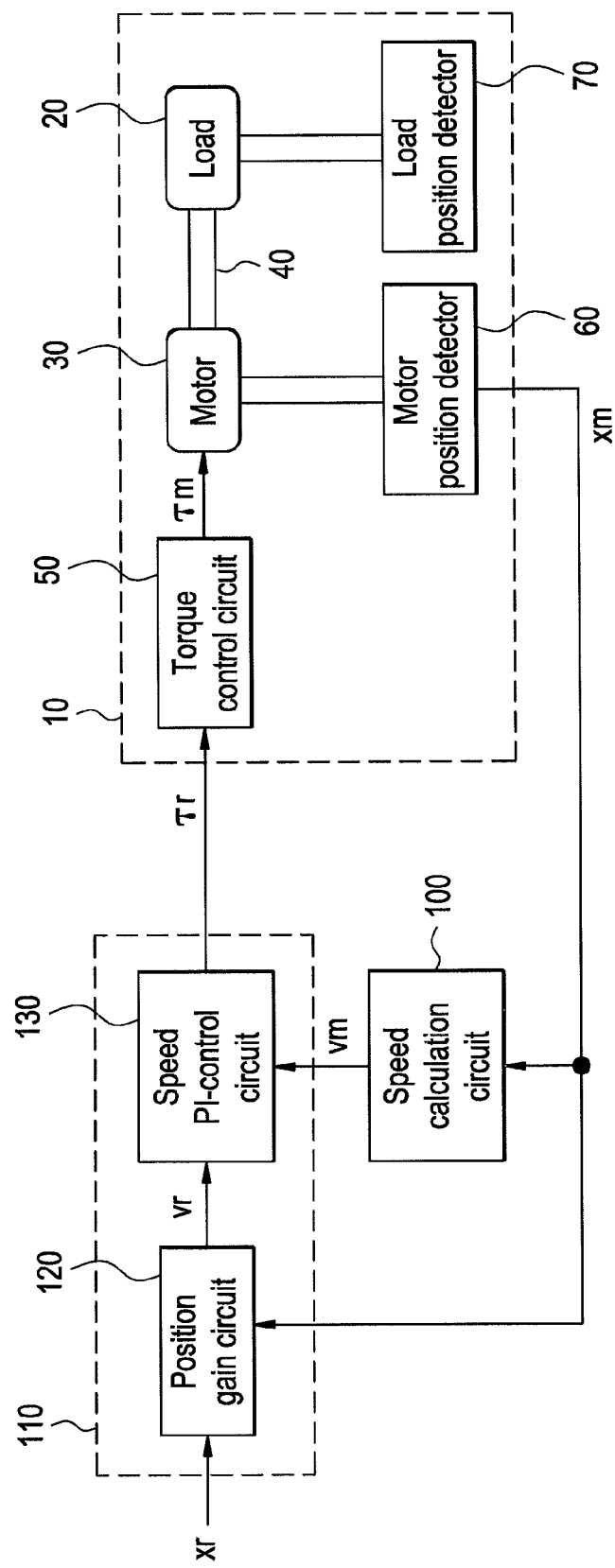
FIG. 3 is a block diagram illustrating a machine position control device according to a semi-closed control system.

FIG. 3 is a block diagram illustrating a configuration of a semi-closed control system, in which neither the load position detector 70 nor the load position signal $x_l$ is provided compared to the configuration in FIG. 1. Moreover, the position-signal combination circuit 90, the stability compensation circuit 80, and the damping compensation circuit 140 are not provided; thus, the motor position signal $x_m$ is directly inputted as the control-target position signal $x_{fb}$ into the position gain circuit 120.

Because in the semi-closed control system represented in FIG. 3, the load position signal $x_l$ is not fed back, if deformation of the torque transmission mechanism 40 is included therein, the position of the load 20 cannot be exactly controlled. However, the position gain $k_p$ of the position gain circuit can be set relatively high with the stability of the control system being maintained; therefore, the system has a characteristic that the response for controlling the motor position signal $x_m$ can be increased.

Moreover, in the semi-closed control system, an open-loop transfer function L(s) obtained by opening the entire control loop at the position of the torque command signal $\tau_r$ (also called as a single loop transfer function; hereinafter, simply called as an open-loop transfer function) can be expressed by the following equation using the speed gain $k_v$ and the speed-integration gain $\omega_{vi}$.

[Equation 7]

$$L(s) = \frac{k_v\{s^2 + (k_p + \omega_{vi})s + k_p\omega_{vi}\}}{s} G_p(s) \qquad (7)$$

$$= -\frac{k_v\{s^2 + (k_p + \omega_{vi})s + k_p\omega_{vi}\}}{s} \cdot \frac{\omega_z^{-2}s^2 + 1}{J \cdot s^2(\omega_p^{-2}s^2 + 1)}$$

$$= -\frac{k_v(s + k_p)(s + \omega_{vi})}{s} \cdot \frac{\omega_z^{-2}s^2 + 1}{J \cdot s^2(\omega_p^{-2}s^2 + 1)}$$

In the open-loop transfer function L(s) of the semi-closed control system, the transfer function $G_p(s)$, of the control target 10, from the torque command signal $\tau_r$ to the motor position signal $x_m$ is included as an element. Therefore, the anti-resonance points $z_0$ included in $G_p(s)$ are intactly included as zeroes of the open-loop transfer function. While, zeroes of the open-loop transfer function, except for the anti-resonance points, are real number zeroes of $-\omega_{vi}$ and $-k_p$ set in the speed PI-control circuit 130 and the position gain circuit 120.

On the other hand, regarding the semi-closed control system, by performing the feedback of the load position signal $x_l$, the position of the load 20 can also be considered to be exactly controlled despite deformation of the torque transmission mechanism 40. However, if the load position signal $x_l$ is used without modification, the control in a range higher than a predetermined frequency becomes unstable due to the effect of phase delay caused by low mechanical rigidity of the control target 10; therefore, a configuration has been considered as disclosed in Patent Document 1, in which feedback of the motor position signal $x_m$ is performed in a frequency range higher than a predetermined one.

The configuration is equivalent to that in FIG. 1 in which the damping-compensation signal $\tau_c$ is set to nil by removing the damping compensation circuit 140, and the load position signal $x_l$, instead of the compensated load-position signal $x_{lc}$, is directly inputted into the position-signal combination circuit 90 by removing the stability compensation circuit 80. That is, the feedback of a signal, obtained by combining the load position signal xl and the motor position signal xm in the position-signal combination circuit 90, into the position gain circuit 120 is performed.

Figure 4:
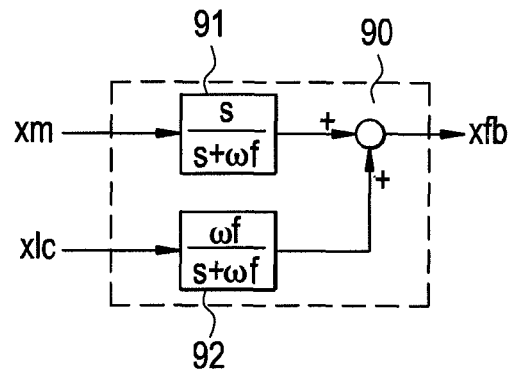
FIG. 4 is a block diagram illustrating an internal configuration of a position-signal combination circuit.

FIG. 4 is a block diagram illustrating an internal configuration of the position-signal combination circuit 90.

A motor-position filter 91 receives the motor position signal $x_m$ as input, and outputs a filtered signal obtained by using a high-pass filter $F_m(s)$ whose filter frequency is $\omega_f$. While, a load-position filter 92 receives the compensated load-position signal $x_{lc}$ as input, and outputs a filtered signal obtained by using a low-pass filter $F_l(s)$ whose filter frequency is the same as $\omega_f$ the motor-position filter 91.

Thereby, a summed signal obtained by summing the output from the motor-position filter 91 and that from the load-position filter 92 is outputted from the position-signal combination circuit 90 as the control-target position signal $x_{fb}$.

That is, the position-signal combination circuit 90 performs calculation expressed by the following equation.

[Equation 8]

$$x_{fb} = F_m(s)x_m + F_1(s)x_{1c} \qquad (8)$$

$$= \frac{s}{s + \omega_f} x_m + \frac{\omega_f}{s + \omega_f} x_{1c}$$

That is, the position-signal combination circuit 90 synthesizes the control-target position signal $x_{fb}$ from the low-frequency component of the compensated load-position signal $x_{lc}$ and the high-frequency component of the motor position signal $x_m$. Thus, the circuit is configured in such a way that the higher the filter frequency $\omega_f$, the more the ratio of utilizing the compensated load-position signal $x_{lc}$ than the motor position signal $x_m$ is increased.

However, the control-target position signal $x_{fb}$ is generated by synthesizing the frequency components of the motor position signal $x_m$ and the load position signal $x_l$, and the load position signal $x_l$ is excessively included in the control-target position signal $x_{fb}$ at a frequency lower than the filter frequency $\omega_f$. Therefore, in order to improve the control accuracy of the load position signal $x_l$, not only by sufficiently increasing the position gain $k_p$ of the position gain circuit 120, but by increasing the filter frequency $\omega_f$ of the position-signal combination circuit 90, the utilization rate of the load position signal $x_l$ is needed to be increased.

However, as represented in FIG. 2, because regarding the response $G_l(s)$ of the load position signal $x_l$ to the torque command signal $\tau_r$, its phase delays more than that of the response $G_p(s)$ of the motor position signal $x_m$ to the torque command signal $\tau_r$, regarding the open-loop transfer function L(s), its phase delays more than that of the semi-closed control system expressed by Equation 7. As a result, because the control system tends to be unstable, and its vibration also tends to increase, the filter frequency $\omega_f$ and the position gain $k_p$ cannot have been sufficiently increased, Consequently, the stability compensation circuit 80 is configured in such a way that the compensated load-position signal $x_{lc}$ in which compensation has been performed for the phase delay of the load position signal $x_l$ is outputted.

Figure 5:
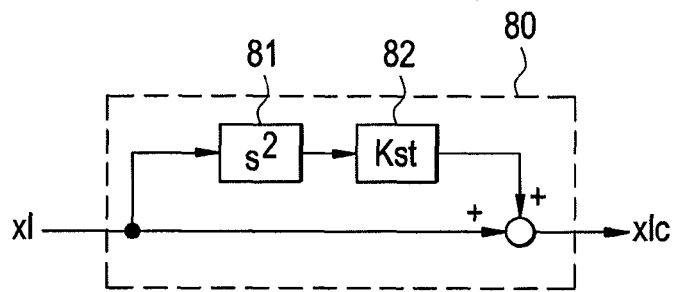
FIG. 5 is a block diagram illustrating an internal configuration of a stability compensation circuit.

FIG. 5 is a block diagram illustrating an internal configuration of the stability compensation circuit 80.

A second-order differential circuit 81 outputs the second-order differential signal of the load position signal $x_l$. A stability-compensation gain circuit 82 outputs a signal that is obtained by multiplying the output of the second-order differential circuit 81 by a stability compensation gain $K_{st}$ set from the exterior. Moreover, the stability compensation circuit 80 outputs a summed signal, as the compensated load-position signal $x_{lc}$, obtained from the output of the stability-compensation gain circuit 82 and the load position signal $x_l$.

That is, the stability compensation circuit 80 performs calculation expressed by the following equation represented by a transfer function $C_{st}(s)$.

[Equation 9]

$$\frac{x_{1c}}{x_1} = C_{st}(s) = K_{st} \cdot s^2 + 1 \quad (9)$$

Because the stability compensation circuit 80 operates as above, the transfer function from the torque command signal $\tau_r$ to the compensated load-position signal $x_{lc}$ is expressed by the following equation.

[Equation 10]

$$\frac{x_{1c}}{\tau_r} = (K_{st}s^2 + 1)G_1(s) \quad (10)$$

$$= \frac{K_{st}s^2 + 1}{J \cdot s^2(\omega_p^{-2}s^2 + 1)}$$

Here, the stability compensation gain $K_{st}$ is set by the following equation using the anti-resonance frequency $\omega_z$ of the control target 10.

[Equation 11]

$$K_{st} = 1/\omega_z^2 \quad (11)$$

Here, the anti-resonance frequency $\omega_z$ can be estimated by a method such as frequency-response measurement of the control target 10, or vibration-frequency measurement of the control target 10 when the speed gain $k_v$ of the speed PI-control circuit 130 is increased.

When the stability compensation gain $K_{st}$ is set as expressed by Equation 11, the transfer function from the torque command signal $\tau_r$ to the compensated load-position signal $x_{lc}$ agrees with $G_p(s)$ in Equation 4; moreover, the transfer function from the torque command signal $\tau r$ to the control-target position signal $xfb$ also agrees with $G_p(s)$.

[Equation 12]

$$\frac{x_{fb}}{\tau_r} = \frac{x_{1c}}{\tau_r} = \frac{x_m}{\tau_r} = G_p(s) \quad (12)$$

Therefore, the transfer function from the torque command signal $\tau_r$ to the basic control-torque signal $\tau_b$ agrees with the open-loop transfer function as expressed by the following equation, when the semi-closed control is performed as expressed by Equation 7.

[Equation 13]

$$\frac{\tau_b}{\tau_r} = -\frac{k_v(s+k_p)(s+\omega_{vi})}{s} \frac{\omega_s^{-2}s^2 + 1}{J \cdot s^2(\omega_p^{-2}s^2 + 1)} \quad (13)$$

As a result of the above, stable control equivalent to the semi-closed control can be ensured by using the stability compensation circuit 80; moreover, the position gain $k_p$ of the position gain circuit 120, and the filter frequency $\omega_f$ of the position-signal combination circuit 90 can be sufficiently increased.

As a result, control accuracy of the load position signal $x_l$ can be improved.

Moreover, the anti-resonance points $z_0$ of the control target 10 expressed by Equation 6 are included in zeroes of the open-loop transfer function similarly to the case of the semi-closed control.

Here, a relationship between the stability compensation circuit 80 and high-frequency noises is explained.

The stability compensation circuit 80 is configured so as to output the compensated load-position signal $x_{lc}$ by calculation including the second-order differential of the load position signal $x_l$. However, the control-target position signal $x_{fb}$ is obtained through the load-position filter 92, and, because the response of the position control system is generally slower than that of the speed PI-control circuit 130, the filter frequency $\omega_f$ of the position-signal combination circuit 90 is needless to be extremely increased; therefore, the control-target position signal $x_{fb}$ does not become extremely noisy.

The operation of the torque command signal $\tau_r$ in response to the input of the position command signal $x_r$ is similar to the general semi-closed control; therefore, even if the position command signal $x_r$ steeply varies, a problem never occurs in which the torque command signal $\tau r$ steeply varies.

Moreover, by the damping compensation circuit 140, using the position command signal $x_r$, the motor position signal $x_m$, and the load position signal $x_l$, the damping-compensation torque signal $\tau_c$ calculated based on the damping adjustment parameter $\alpha$ set from the exterior is added to the basic control-torque signal $\tau_b$. Thereby, the device is configured so as to obtain the torque command signal $\tau_r$.

Figure 6:
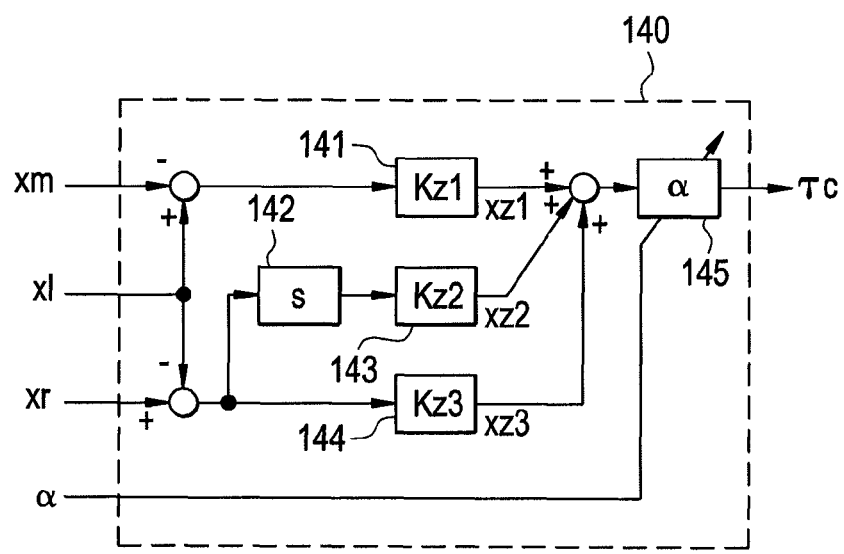
FIG. 6 is a block diagram illustrating an internal configuration of a damping compensation circuit.

FIG. 6 is a block diagram illustrating an internal configuration of the damping compensation circuit 140.

A first damping gain circuit 141 receives as input a difference signal between the load position signal $x_l$ and the motor position signal $x_m$, and outputs as a first damping compensation signal $x_{z1}$ a signal obtained by multiplying the difference signal by a first damping gain $K_{z1}$. A load-position differential circuit 142 outputs a signal obtained by differentiating the difference signal between the position command signal $x_r$ and the load position signal $x_l$, while a second damping gain circuit 143 outputs as a second damping compensation signal $x_{z2}$ a signal obtained by multiplying the output from the load-position differential circuit 142 by a second damping gain $K_{z2}$. A third damping gain circuit 144 outputs as a third damping compensation signal $x_{z3}$ a signal obtained by multiplying the difference signal between the position command signal $x_r$ and the load position signal $x_l$ by a third damping gain $K_{z3}$. A damping adjustment circuit 145 outputs a signal obtained by multiplying by the damping adjustment parameter $\alpha$ a signal obtained by summing the first damping compensation signal $x_{z1}$, the second damping compensation signal $x_{z2}$, and the third damping compensation signal $x_{z3}$.

That is, the damping compensation circuit 140 performs the following calculation.

[Equation 14]

$$\tau_c = \alpha\{K_{z1}(x_l - x_m) + K_{z2} \cdot s \cdot (x_r - x_l) + K_{z3} \cdot (x_r - x_l)\} \quad (14)$$

Next, a method of setting constant values for the damping compensation circuit 140 is explained. Due to the damping compensation circuit 140 that operates as described above, the transfer function from the torque command signal $\tau_r$ to the damping-compensation torque signal $\tau_c$ can be expressed by the following equation using Equation 6, Equation 7, and Equation 8.

[Equation 15]

$$\frac{\tau_c}{\tau_r} = -\alpha\{K_{z1}(G_p(s) - G_1(s)) + (K_{z2} \cdot s + K_{z3})G_1(s)\} \quad (15)$$
$$= -\alpha \frac{K_{z1}\omega_z^{-2}s^2 + K_{z2}s + K_{z3}}{J \cdot s^2(\omega_p^{-2}s^2 + 1)}$$

The first damping gain $K_{z1}$, the second damping gain $K_{z2}$, and the third damping gain $K_{z3}$ of the damping compensation circuit 140 are set as follows using the speed gain kv, the speed-integration gain ωvi, and the position gain kp, which are constant values, set in the speed PI-control circuit 130 and the position gain circuit 120.

[Equation 16]

$$K_{z1} = k_v \omega_z^2 \quad (16)$$

[Equation 17]

$$K_{z2} = k_v(k_p + \omega_{vi}) \quad (17)$$

[Equation 18]

$$K_{z3} = k_v k_p \omega vi \quad (18)$$

As a result of the above setting operation, the transfer function from the torque command signal $\tau_r$ to the damping-compensation torque signal $\tau_c$ can be expressed by the following equation.

[Equation 19]

$$\frac{\tau_c}{\tau_r} = -\frac{k_v\{s^2 + (k_p + \omega_{vi})s + k_p\omega_{vi}\}}{s} \cdot \frac{\alpha \cdot s}{J \cdot s^2(\omega_p^{-2}s^2 + 1)} \quad (19)$$

Moreover, the open-loop transfer function obtained by opening the loop at the position of the torque command signal $\tau_r$ can be expressed by the following equation using Equation 15 and Equation 19.

[Equation 20]

$$L(s) = \frac{\tau_b + \tau_c}{\tau_r} \quad (20)$$
$$= -\frac{k_v\{s^2 + (k_p + \omega_{vi})s + k_p\omega_{vi}\}}{s} \cdot \frac{\omega_z^{-2}s^2 + \alpha \cdot s + 1}{J \cdot s^2(\omega_p^{-2}s^2 + 1)}$$
$$= -\frac{k_v(s + k_p)(s + \omega_{vi})}{s} \cdot \frac{\omega_z^{-2}s^2 + \alpha \cdot s + 1}{J \cdot s^2(\omega_p^{-2}s^2 + 1)}$$

Therefore, the anti-resonance points of the open-loop transfer function vary from $z_0$ expressed by Equation 6 to $z_c$ expressed by the following equation.

[Equation 21]

$$z_c = -\zeta_z \omega_z \pm j \cdot \omega_z \sqrt{1 - \zeta_z^2} \quad (21)$$

where a damping coefficient $\zeta_z$ at the anti-resonance points used in the above is expressed by the following equation.

[Equation 22]

$$\zeta_z = \alpha \cdot \omega_z / 2 \quad (22)$$

The pole and the zero point of the open-loop transfer function expressed by Equation 20 do not vary, according to varying of the damping adjustment parameter α, except for the anti-resonance points expressed by Equation 21 and equation 22. Moreover, the anti-resonance frequency $\omega_z$ as the absolute value of the anti-resonance points does not vary, but only the damping coefficient at the anti-resonance points varies.

By configuring the damping compensation circuit 140 as the above, only the damping coefficient at the anti-resonance points of the open-loop transfer function with respect to the control system in FIG. 1 is configured to be changed by the damping adjustment parameter α set from the exterior.

An advantage of this configuration is described as follows in which only the damping coefficient at the anti-resonance points of the open-loop transfer function is changed by the damping adjustment parameter α set from the exterior.

If the speed gain $k_v$ is sufficiently increased, the closed-loop pole of the control system is known to asymptote to zero of the open-loop transfer function. That is, in a case in which the damping adjustment parameter α is set to zero in the semi-closed control system having the open-loop transfer function expressed by Equation 7, or in the control system in FIG. 1, when the speed control gain $k_v$ is increased, a part of the closed-loop pole approaches the anti-resonance points of the control target 10 expressed by Equation 6. Accordingly, in the closed-loop pole, the damping coefficient becomes relatively low, and the response of the control target 10 becomes vibratory.

On the other hand, as expressed by Equation 22, when the damping adjustment parameter α is increased, the damping coefficient at the anti-resonance point increases. Moreover, the other zeroes of the open-loop transfer function L(s) are $-\omega_{vi}$ and $-k_p$ being real numbers.

As a result, when the speed control gain $k_v$ is increased, the closed-loop pole approaches the anti-resonance point where the damping coefficient is relatively large, and the real-number zero; therefore, even though an external disturbance is exerted to the control target 10, the vibration of the control system is controlled.

Here, the damping adjustment parameter α is set higher enough to such a degree that the damping coefficient $\zeta_z$ expressed by Equation 22 becomes approximately 0.5, so that the adjustment may be easy to be performed. Moreover, in order to increase the disturbance reduction effect, quite similar to the adjustment method in the general semi-closed control, the speed gain $k_v$, speed-integration gain $\omega_{vi}$, and the position gain $k_p$ may be increased.

Here, even if, in the damping compensation circuit 140, the first damping compensation signal $x_{z1}$ is calculated by multiplying a load acceleration signal, obtained by second-order differentiating the load position signal $x_l$, by the speed gain $k_v$ and −1, because the open-loop transfer function agrees with Equation 20, similar effect can be obtained; however, because the second-order differential signal of the load position signal $x_l$ is used, high-frequency noise components thereof increase. Therefore, as described above, by calculating the first damping compensation signal $x_{z1}$ by multiplying the difference signal between the motor position signal $x_m$ and the load position signal $x_l$ by the first damping gain $K_{z1}$, the device is configured so that the noise problems do not occur.

As described above, due to the effect of the stability compensation circuit 80 and the damping compensation circuit 140, not only by the adjustment performed by a method quite similar to that for the semi-closed control, but by a simple adjustment method in which the damping adjustment parameter α, as a parameter that is externally adjusted is only increased to an adequate value, the control accuracy of the load position signal $x_l$ can be improved; consequently, a control system can be realized in which the vibration is reduced also against the external disturbance exerted to the control target 10.

Here, in the above description, the calculation of the block diagram represented in FIG. 6, that is, the calculation expressed by Equation 14 has been performed in the damping compensation circuit 140; however, similar effects can be obtained, even though the calculation expressed by the following equation for directly obtaining the damping compensation torque signal $\tau_c$ from the input signals into the damping compensation circuit 140.

[Equation 23]

$$\tau_c = \alpha(K_{z2} \cdot s + K_{z3})x_r - \alpha(K_{z2} \cdot s + K_{z3} - K_{z1})x_l - \alpha \cdot K_{z1} \cdot x_m \quad (23)$$

Moreover, the basis of the effect obtained by the damping compensation circuit 140 is that the vibration is reduced, by increasing the damping coefficient at the anti-resonance points of the open-loop transfer function, as expressed by Equation 22, so as to increase the damping coefficient of the closed-loop pole. Therefore, the device may be configured so that, if their open loop transfer functions are the same as each other, the calculation operation, in response to the position command signal $x_r$, in the damping compensation circuit 140 is different from those in Equation 14 and Equation 23.

For example, instead of the position command signal $x_r$ inputted into the damping compensation circuit 140, a signal obtained by low-pass filtering the position command signal $x_r$ may be used; thereby, varying of the damping-compensation torque signal $\tau_c$ corresponding to that of the position command signal $x_r$ may be smoothed. In contrast, a command acceleration signal $a_r$ as the second-order differential signal of the position command signal $x_r$ is calculated inside the damping compensation circuit 140; then, a signal obtained by multiplying the command acceleration signal $a_r$ by an adequate gain and the damping adjustment parameter $\alpha$ is further added to the damping-compensation torque signal $\tau c$. Thereby, the device may be configured so that the response of the motor position signal xm with respect to varying of the position command signal xr, when the damping adjustment parameter $\alpha$ is increased, becomes as fast as possible.

Embodiment 2

In Embodiment 1, the configuration for calculating the basic control-torque signal $\tau_b$ has been explained by Equations 1, 2, and 3 using the position gain circuit 120, the speed calculation circuit 100, and the speed PI-control circuit 130; however, the calculation may be performed using another configuration. Especially, when the transfer function from the torque command signal $\tau r$ to the basic control-torque signal $\tau_b$ is equivalent to that expressed by Equation 13 in Embodiment 1, the calculation using the damping compensation circuit 140 may be performed as above without any modification.

On the other hand, when the transfer function from the torque command signal $\tau_r$ to the basic control-torque signal $\tau_b$ is different from that expressed by Equation 13, the calculation using the damping compensation circuit 140 may be correspondingly modified. The details are explained as follows.

For example, as measures to a case that the resolution of the motor position detector 60 is extremely low, assuming that the speed calculation circuit 100 calculates the motor speed signal $v_m$ by calculation in which a speed filter $F_v(s)$ is added as expressed by Equation 24 instead of the differential calculation of Equation 4, the transfer function from the torque command signal $\tau_r$ to the basic control-torque signal $\tau_b$ can be expressed by Equation 25.

[Equation 24]

$$v_m = s \cdot F_v(s) \cdot x_m \quad (24)$$

[Equation 25]

$$\frac{\tau_b}{\tau_r} = -\frac{k_v \left\{ \begin{array}{c} s^2 F_v(s) + \\ (k_p + \omega_{vi} F_v(s))s + k_p \omega_{vi} \end{array} \right\}}{s} \cdot \frac{\omega_z^{-2} s^2 + 1}{J \cdot s^2 (\omega_p^{-2} s^2 + 1)} \quad (25)$$

In this case, the calculation of the damping-compensation torque signal $\tau_c$ in the damping compensation circuit 140 may be performed by the following equation using the first damping gain $K_{z1}$ set by Equation 16, the third damping gain $K_{z3}$ set by Equation 18, and the damping adjustment parameter $\alpha$, and using a fourth damping gain $Kz4$, a fifth damping gain $Kz5$, and a transfer function being the same as the speed filter $F_v(s)$ in Equation 24, which are newly introduced.

[Equation 26]

$$\tau_c = \alpha \{ K_{z1} F_v(s) \cdot (x_r - x_m) + (K_{z4} F_v(s) + K_{z5}) \cdot s \cdot (x_r - x_l) + K_{z3} \cdot (x_r - x_l) \} \quad (26)$$

where the fourth damping gain $K_{z4}$ and the fifth damping gain $K_{z5}$ are respectively set as follows.

[Equation 27]

$$K_{z4} = k_v \omega_{vi} \quad (27)$$

[Equation 28]

$$K_{z5} = k_v k_p \quad (28)$$

Then, the open-loop transfer function L(s) obtained by opening at the position of the torque command signal $\tau_r$ can be expressed by the following equation.

[Equation 29]

$$L(s) = -\frac{k_v \left\{ \begin{array}{c} s^2 F_v(s) + \\ (k_p + \omega_{vi} F_v(s))s + k_p \omega_{vi} \end{array} \right\}}{s} \cdot \frac{\omega_z^{-2} s^2 + \alpha \cdot s + 1}{J \cdot s^2 (\omega_p^{-2} s^2 + 1)} \quad (29)$$

That is, by varying the damping adjustment parameter $\alpha$, only the damping coefficient at the anti-resonance point among the zero points of the open-loop transfer function expressed by Equation 29 is configured to vary. Here, regarding the zero points except for the anti-resonance points, because if Equation 29 is expanded the description becomes complicated, the description is omitted; however, it is obvious that the coefficient does not vary even though the damping adjustment parameter $\alpha$ varies, and moreover, by a general adjustment, the zero points except for the anti-resonance points become real numbers, or complex zeroes whose damping coefficient is relatively large.

Accordingly, even when the transfer function from the torque command signal $\tau_r$ to the basic control-torque signal $\tau_b$ is different from that expressed by Equation 13 in Embodiment 1, if the speed gain $k_v$ is sufficiently large, only by increasing the damping adjustment parameter $\alpha$ to an adequate value similarly to that in Embodiment 1, the damping coefficient of the closed-loop pole can be increased. Thereby, even when an external disturbance is exerted to the control target 10, the vibration can be reduced; consequently, the position of the motor 30 or the position of the load 20 can be accurately controlled by a simple adjustment operation.

Embodiment 3

In Embodiment 1, by summing the load position signal $x_l$ and the multiplied signal obtained by multiplying by the stability compensation gain $K_{st}$ the signal obtained by second-order differentiating the load position signal $x_l$, the compensation has been performed for the phase delay of the load position signal $x_l$; however, if a method in which another calculation is performed also has the effect of advancing the phase at a frequency close to the anti-resonance frequency $\omega_z$ and the resonance frequency $\tau_p$ of the control target 10, even though the effect is large or small, the compensation can also be performed thereby for the phase delay of the load position signal $x_l$.

Figure 7:
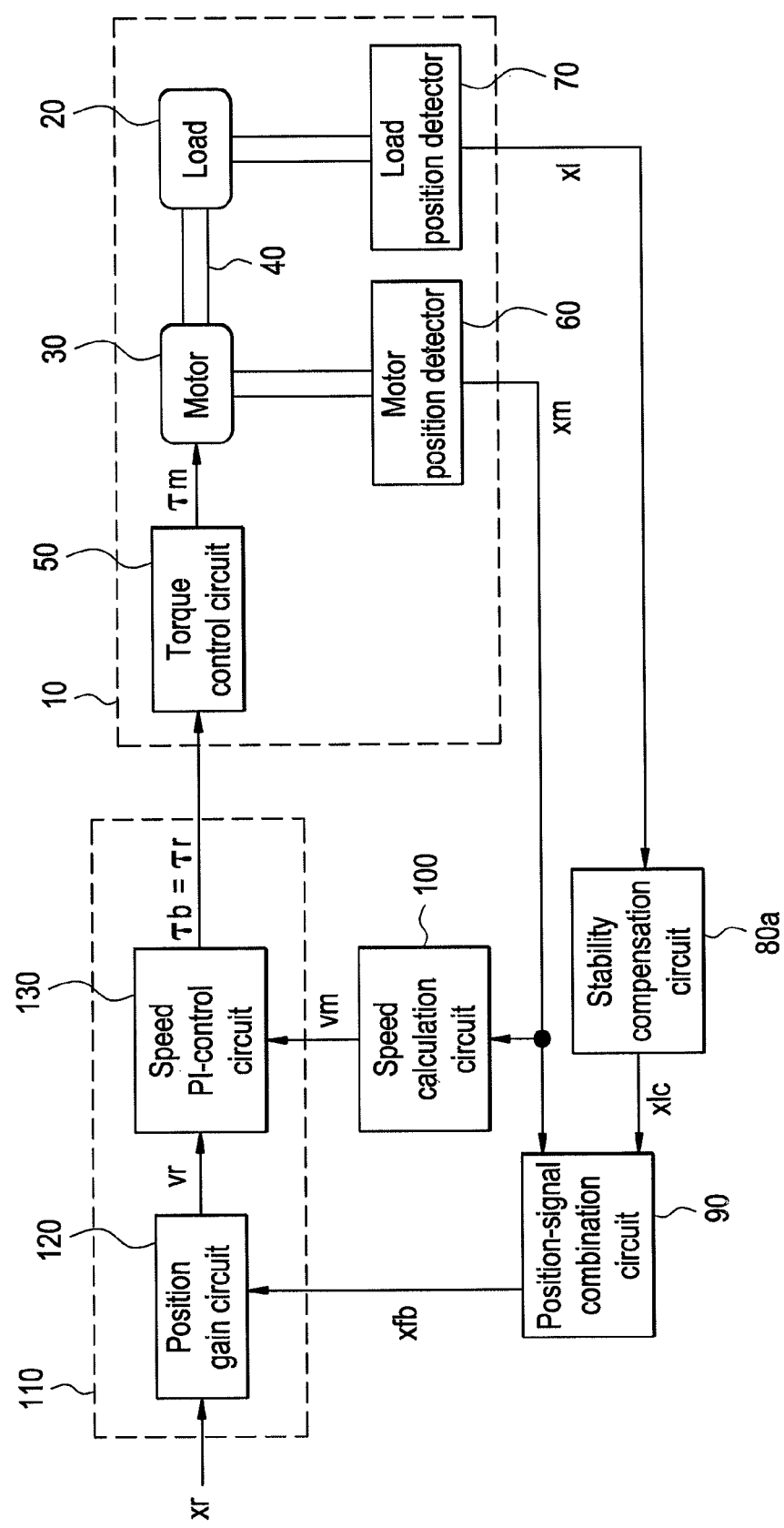
FIG. 7 is a block diagram illustrating a machine position control device according to Embodiment 3 of the present invention.

FIG. 7 is a block diagram illustrating a machine position control device according to Embodiment 3 of the present invention, in which the damping compensation circuit 140 of Embodiment 1 represented in FIG. 1 is omitted so that the basic control-torque signal $\tau_b$ is configured to be used as the torque command signal $\tau_r$ without any modification.

For example, in a stability compensation circuit 80*a*, calculation expressed by the following transfer function is performed using the stability compensation gain $K_{st}$ and a filter time-constant $t_{st}$.

[Equation 30]

$$x_{1c} = \frac{K_{st}s^2 + 1}{(t_{st}s + 1)^2} \cdot x_1 \qquad (30)$$

Equation 30 is a calculation equation in which a secondary low-pass filter is further added to the stability compensation circuit 80 in Embodiment 1, by which more effect can be obtained for reducing noises when any problem occurs caused by especially low resolution of the load position detector 70.

In this case, the stability compensation gain $K_{st}$ may be set to a value close to that in Equation 11 used in Embodiment 1; moreover, if the filter time-constant $t_{st}$ is set to a value smaller than the root of the stability compensation gain $K_{st}$, an effect of advancing the phase can be obtained by the calculation of Equation 30.

Here, in Equation 30, the calculation has been performed that includes phase-advancing characteristics due to the denominator and the numerator each being a secondary transfer function; however, even though the denominator and the numerator each being a primary transfer function, for example, as expressed by the following equation, because an effect of advancing the phase at a frequency close to the anti-resonance frequency $\omega_z$ and the resonance frequency $\omega_p$ can be obtained, an effect that the position gain $k_p$ and the filter frequency $\omega_f$ can be increased compared to a configuration in which the stability compensation circuit 80*a* is not provided can be obtained.

[Equation 31]

$$x_{1c} = \frac{t_1 \cdot s + 1}{t_2 \cdot s + 1} \cdot x_1 \qquad (31)$$

Here, the effect of advancing the phase can be obtained when $t_2 < t_1$; moreover, $t_1$ is assumed to be set to a value close to the inverse number of the anti-resonance frequency $\omega_z$.

By configuring as described above, the stability compensation circuit 80*a* receives as input the load position signal $x_l$, and outputs, based on the calculation of the phase-advancing transfer function expressed by Equation 30 or Equation 31, the compensated load-position signal $x_{1c}$. Moreover, the position-signal combination circuit 90 outputs as the control-target position signal $x_{fb}$, a summed signal obtained by summing a signal obtained by high-pass filtering the motor position signal $x_m$ and a signal obtained by low-pass filtering the compensated load-position signal $x_{1c}$. Therefore, in the configuration according to Embodiment 3, the calculation with respect to the torque command signal $\tau_r$ is performed based on the position command signal $x_r$ and the control-target position signal $x_{fb}$.

As a result, the control-target position signal $x_{fb}$ whose phase is more advanced compared to that of a configuration provided without the stability compensation circuit 80*a* is fed back thereto, and, even if the mechanical rigidity of the control target 10 is relatively low, the filter frequency $\omega_f$ of the position-signal combination circuit 90 and the position gain $k_p$ of the position gain circuit 120 can be stably increased; consequently, the control accuracy of the load position signal $x_l$ can be improved.

Embodiment 4

An operation of the damping compensation circuit 140 when the stability compensation circuit 80 and the position-signal combination circuit 90 in Embodiment 1 are omitted is as follows.

Figure 8:
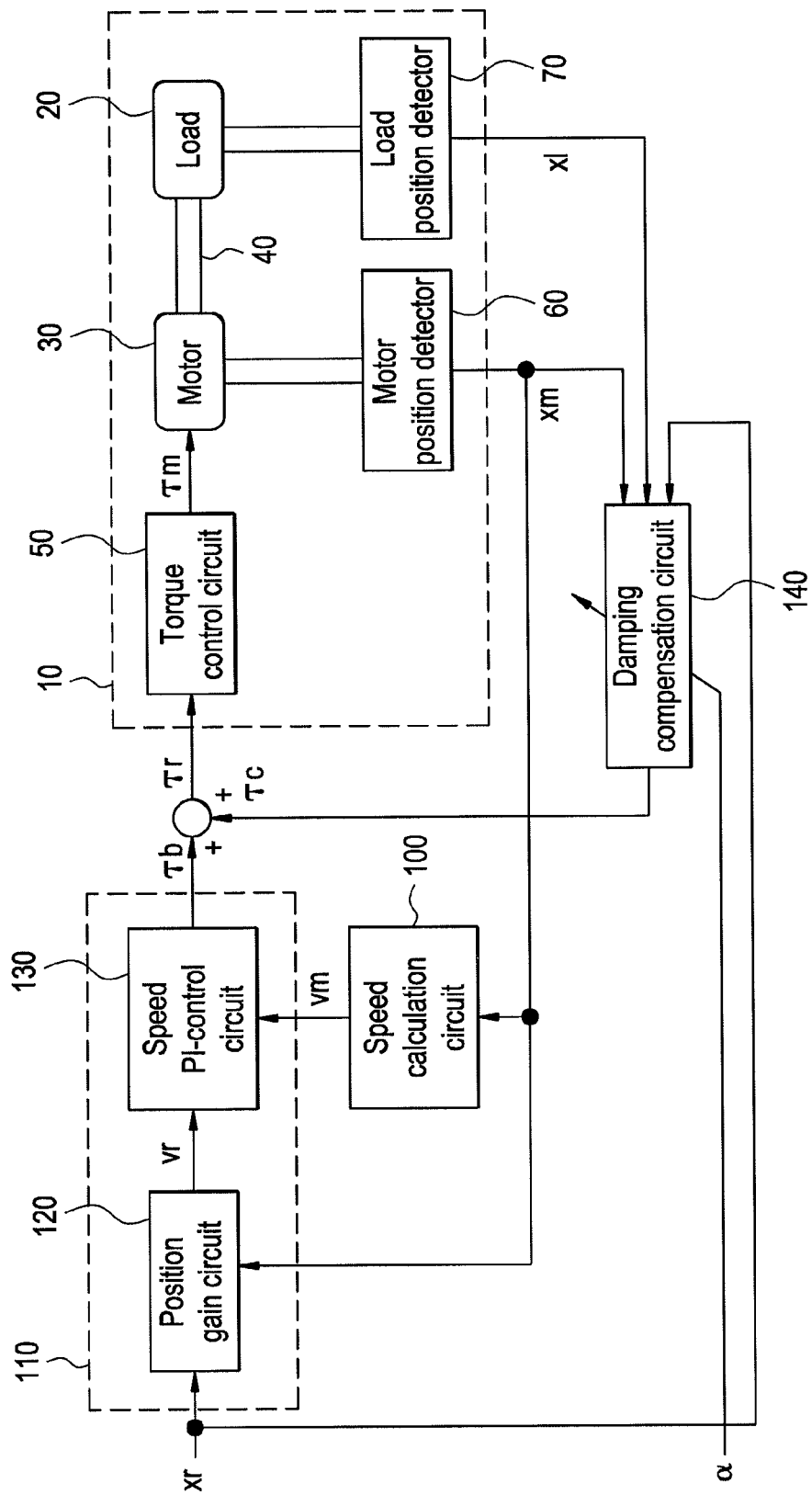
FIG. 8 is a block diagram illustrating a machine position control device according to Embodiment 4 of the present invention.

FIG. 8 is a block diagram illustrating a machine position control device according to Embodiment 4, in which the stability compensation circuit 80 and the position-signal combination circuit 90 are omitted from the configuration represented in FIG. 1, and the motor position signal $x_m$ instead of the control-target position signal $x_{fb}$ is directly inputted into the position gain circuit 120.

In the above configuration, the open-loop transfer function can be expressed by Equation 20 similarly to that in Embodiment 1, and the device is configured in such a way that only the damping coefficient $\zeta_z$ at the anti-resonance points of the open-loop transfer function is varied by varying the damping adjustment parameter $\alpha$. As a result, if the speed gain $k_v$ is sufficiently large, only by adequately increasing the damping adjustment parameter $\alpha$, the damping coefficient of the closed-loop pole can be increased; consequently, even in a case in which an external disturbance is exerted to the control target 10, the vibration can be reduced.

Here, in Embodiment 4, because the stability compensation circuit 80 and the position-signal combination circuit 90 are omitted, a function for operating in such a way that the motor position signal $x_m$ agrees with the position command signal $x_r$, and compensates the steady error occurring between the load position signal $x_l$ and the motor position signal $x_m$ is not provided; however, in application in which such error is not treated as a problem, the vibration can be reduced by increasing the speed gain $k_v$ and the position gain $k_p$ using a simple configuration of the control system, and by increasing the damping coefficient at the anti-resonance points of the open-loop transfer function using the function of the damping compensation circuit 140; consequently, the position of the motor 30 can be accurately controlled. Moreover, as a result, the position of the load 20 can also be controlled without problems. Therefore, the position of the motor 30 and the load 20 can be accurately controlled by a simple adjustment operation.

Here, except for configurations represented in Embodiment 1 through Embodiment 4, modified examples such as a configuration that the motor speed signal $v_m$ as speed feedback of the motor is not inputted into the position-speed control circuit 110, and a configuration that a circuit for performing speed IP control is used instead of the speed PI-control circuit 130, etc. can be proposed; thereby, the stability compensation circuit 80 and the damping compensation circuit 140 having transfer characteristics corresponding to the changes can be configured similarly to those in Embodiment 1 through Embodiment 4.

What is claimed is:

1. A machine position control device comprising:
a position-speed control means for receiving as input a position command signal indicating a position target value of a load driven by a motor, and a control-target position signal as reference information related to present positions of the motor and the load, and for outputting a torque command signal as a target value of torque at which the motor drives the load;
a stability compensation means for receiving as input a load position signal as a present-position measurement value of the load, and for outputting a compensated load-position signal after a phase delay of the load position signal has been compensated based on a phase-advance transfer function; and
a position-signal combination means for combining a signal including a high-frequency component of a motor position signal as a present-position measurement value of the motor, with a signal including a low-frequency component of the compensated load-position signal, and for outputting the control-target position signal.

2. A machine position control device as recited in claim 1, wherein the stability compensation means sums the load position signal and a signal obtained by multiplying by a stability compensation gain a signal having been obtained by second-order differentiating the load position signal.

3. A machine position control device as recited in claim 1, wherein the position-speed control means also receives as input a motor speed signal indicating a present speed of the motor.

4. A machine position control device comprising:
a position-speed control means for receiving as input a position command signal indicating a position target value of a load driven by a motor, and a control-target position signal as reference information related to present positions of the motor and the load, and for outputting a basic control-torque signal to be a basis for calculating a torque command signal as a target value of torque at which the motor drives the load;
a stability compensation means for receiving as input a load position signal as a present-position measurement value of the load, and for outputting a compensated load-position signal after a phase delay of the load position signal has been compensated based on a phase-advance transfer function;
a position-signal combination means for combining a signal including a high-frequency component of a motor position signal as a present-position measurement value of the motor, with a signal including a low-frequency component of the compensated load-position signal, and for outputting the control-target position signal; and
a damping compensation means, being means for receiving as input the motor position signal and the load position signal and for outputting a damping-compensation torque signal to which the basic control-torque signal is added for obtaining the torque command signal, for calculating the damping-compensation torque signal, when a load drive system with the motor is modeled as a two-inertia system, based on a second open-loop transfer function determined, in response to a first open-loop transfer function as a transfer function from the torque command signal to the basic control-torque signal, so that an open-loop transfer function obtained by combining with the first open-loop transfer function agrees with a function in which only a damping coefficient at an anti-resonance point of the two-inertia system of the first open-loop transfer function is varied, so that the transfer function from the torque command signal agrees with the second open-loop transfer function.

5. A machine position control device as recited in claim 4, wherein the damping-compensation torque signal outputted from the damping compensation means is a signal obtained by multiplying, by a coefficient based on a damping adjustment parameter for adjusting the damping coefficient at the anti-resonance point of the two-inertia system, a signal obtained by summing a signal obtained by multiplying by a first damping gain the difference signal between the load position signal and the motor position signal, a signal obtained by multiplying by a second damping gain a signal obtained by differentiating the difference signal between the position command signal and the load position signal, and a signal obtained by multiplying by a third damping gain the difference signal between the position command signal and the load position signal.

6. A machine position control device comprising:
a position-speed control means for receiving as input a position command signal indicating a position target value of a load driven by a motor, and a motor position signal as a present-position measurement value of the motor, and for outputting a basic control-torque signal to be a basis for calculating a torque command signal as a target value of a torque when the motor drives the load; and
a damping compensation means, being means for receiving as input the motor position signal and a load position signal as a present-position measurement value of the load, and for outputting a damping-compensation torque signal to which the basic control-torque signal is added for obtaining the torque command signal, for calculating the damping-compensation torque signal, when a load drive system with the motor is modeled as a two-inertia system, based on a second open-loop transfer function determined, in response to a first open-loop transfer function as a transfer function from the torque command signal to the basic control-torque signal, so that an open-loop transfer function obtained by combining with the first open-loop transfer function agrees with a function in which only a damping coefficient at an anti-resonance point of the two-inertia system of the first open-loop transfer function is varied, so that the transfer function from the torque command signal agrees with the second open-loop transfer function.

* * * * *